(12) United States Patent
Kim et al.

(10) Patent No.: US 11,905,855 B2
(45) Date of Patent: Feb. 20, 2024

(54) COMBINED POWER GENERATION SYSTEM AND DRIVING METHOD THEREOF

(71) Applicant: DOOSAN ENERBILITY CO., LTD., Changwon-si (KR)

(72) Inventors: Byoung Youn Kim, Yongin-si (KR); Myung Son Kang, Changwon-si (KR); Chang Rim Lee, Gimhae-si (KR); Eun Seong Cho, Busan (KR)

(73) Assignee: DOOSAN ENERBILITY CO., LTD., Changwon-si (KR)

( * ) Notice: Subject to any disclaimer, the term of this patent is extended or adjusted under 35 U.S.C. 154(b) by 0 days.

(21) Appl. No.: 18/109,771

(22) Filed: Feb. 14, 2023

(65) Prior Publication Data

US 2023/0258105 A1  Aug. 17, 2023

(30) Foreign Application Priority Data

Feb. 15, 2022  (KR) .................. 10-2022-0019742

(51) Int. Cl.
| | |
|---|---|
| *F01K 23/10* | (2006.01) |
| *F02C 3/22* | (2006.01) |
| *F02C 6/18* | (2006.01) |

(52) U.S. Cl.
CPC ............ *F01K 23/108* (2013.01); *F01K 23/10* (2013.01); *F02C 3/22* (2013.01); *F02C 6/18* (2013.01)

(58) Field of Classification Search
None
See application file for complete search history.

(56) References Cited

U.S. PATENT DOCUMENTS

| | | | |
|---|---|---|---|
| 4,466,241 A | 8/1984 | Inui et al. | |
| 5,431,007 A * | 7/1995 | Viscovich | ................ F02C 7/16 60/39.12 |

(Continued)

FOREIGN PATENT DOCUMENTS

| | | |
|---|---|---|
| CN | 112648113 A1 | 4/2021 |
| JP | 2948351 B2 | 9/1999 |

(Continued)

OTHER PUBLICATIONS

Doosan Enerbility Co., Ltd., European Search Report dated Jul. 20, 2023 in corresponding European Application No. 23 156 285.1, 8 Pages.

*Primary Examiner* — Gerald L Sung
*Assistant Examiner* — Marc J Amar
(74) *Attorney, Agent, or Firm* — SHOOK, HARDY & BACON L.L.P.

(57) ABSTRACT

A combined power generation system includes a gas turbine, a heat recovery steam generator (HRSG) configured to heat feedwater using combustion gases discharged from the gas turbine and having a high-pressure section, a medium-pressure section, and a low-pressure section having different pressure levels, an ammonia decomposer decomposing ammonia with the combustion gases discharged from the gas turbine, a first exhaust gas line through which the exhaust gases discharged from the gas turbine are transferred to the HRSG, a second exhaust gas line through which the exhaust gases discharged from the gas turbine are transferred to the ammonia decomposer, a third exhaust gas line through which the exhaust gases discharged from the ammonia decomposer are transferred to the HRSG, and a decomposed gas transfer tube connecting the ammonia decomposer and the combustor to transfer decomposed gases generated with the decomposition of ammonia to the combustor.

11 Claims, 3 Drawing Sheets

(56) References Cited

U.S. PATENT DOCUMENTS

| | | | |
|---|---|---|---|
| 11,542,863 B1* | 1/2023 | Wolf | F02C 6/18 |
| 2003/0136130 A1* | 7/2003 | Sugishita | F01K 23/106 |
| | | | 60/39.182 |
| 2008/0155984 A1* | 7/2008 | Liu | C01B 3/48 |
| | | | 422/198 |
| 2014/0096532 A1* | 4/2014 | Broderick | F02C 6/18 |
| | | | 60/774 |
| 2017/0292450 A1* | 10/2017 | Kutnjak | F02C 3/34 |
| 2018/0355794 A1 | 12/2018 | Bulat et al. | |
| 2020/0032676 A1* | 1/2020 | Nose | F02C 3/20 |
| 2022/0099021 A1* | 3/2022 | Uechi | F02C 6/18 |
| 2022/0154646 A1* | 5/2022 | Araki | F02C 7/22 |
| 2022/0162989 A1* | 5/2022 | Cocks | F02C 7/224 |
| 2022/0364505 A1* | 11/2022 | Kim | F02C 7/22 |

FOREIGN PATENT DOCUMENTS

| | | |
|---|---|---|
| JP | 4859929 | 1/2012 |
| JP | 2012-255420 A | 12/2012 |
| JP | 2012255420 A1 | 12/2012 |
| JP | 2015190466 A1 | 11/2015 |
| JP | 201624156 A | 12/2016 |
| JP | 2017180266 A | 10/2017 |
| JP | 2018076794 A1 | 5/2018 |
| JP | 2018095512 A1 | 6/2018 |
| JP | 2018524544 A1 | 8/2018 |
| JP | 6707013 B2 | 6/2020 |
| JP | 2020-147481 A | 9/2020 |
| JP | 2020-148183 A | 9/2020 |
| JP | 2020147478 A1 | 9/2020 |
| JP | 2018-535355 A | 11/2020 |
| JP | 2021-167263 A | 10/2021 |
| JP | 2021185313 A1 | 11/2022 |
| KR | 20180084051 A1 | 7/2018 |
| KR | 20210096274 A1 | 8/2021 |
| KR | 20210121192 A1 | 10/2021 |
| WO | WO2017084876 A1 | 5/2017 |
| WO | WO2017187619 A1 | 11/2017 |
| WO | WO2020189566 A1 | 9/2020 |

* cited by examiner

COMBINED POWER GENERATION SYSTEM AND DRIVING METHOD THEREOF

CROSS REFERENCE TO RELATED APPLICATION

The present application claims priority to Korean Patent Application No. 10-2022-0019742, filed on Feb. 15, 2022, the entire contents of which are incorporated herein for all purposes by this reference.

BACKGROUND OF THE INVENTION

1. Field of the Invention

The present disclosure relates to a combined power generation system and a driving method thereof. More particularly, the present disclosure relates to a combined power generation system having an ammonia decomposer, and a driving method thereof.

2. Description of the Background Art

A combined power generation system is a power generation system that combines a gas turbine and a steam turbine with high efficiency to guide high-temperature exhaust gas from the gas turbine to a heat recovery steam generator (HRSG) and generate steam using thermal energy retained in the exhaust gas. This steam enables power generation by the steam turbine and can be combined with the power generated by the gas turbine to improve thermal efficiency equivalent to the thermal energy retained in the exhaust gas when compared to independent power production by the gas turbine.

A gas turbine is a power engine that mixes compressed air compressed in a compressor and fuel, burns an air-fuel mixture, and rotates a turbine with high-temperature combustion gas. Gas turbines are used to drive generators, aircraft, ships, trains, and the like.

Recently, a gas turbine using hydrogen or ammonia as a fuel has been developed. A combined power generation system using ammonia as a fuel includes a pressure pump that boosts the pressure of liquid ammonia in an ammonia tank, and an ammonia decomposer that decomposes the liquid ammonia pressurized by the pressure pump into hydrogen gas and nitrogen gas, wherein the pressure of liquid ammonia in the ammonia tank is boosted to a pressure that can be fed to a gas turbine. The ammonia decomposer heat-exchanges the liquid ammonia pressurized by the pressure pump with exhaust gas from a gas turbine so as to heat and decompose the liquid ammonia into hydrogen gas and nitrogen gas. Since the ammonia decomposition process is an endothermic reaction, the ammonia decomposer has a burner to decompose ammonia. The burner combusts fuel to generate heat, so there is a problem in that carbon dioxide and pollutants are generated during the combustion process of the fuel.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a combined power generation system capable of reducing carbon dioxide emission and improving thermal efficiency, and a driving method thereof.

In an aspect of the present disclosure, there is provided a combined power generation system including: a gas turbine combusting fuel to generate rotational force; a heat recovery steam generator (HRSG) configured to heat feedwater using combustion gases discharged from the gas turbine and having a high-pressure section, a medium-pressure section, and a low-pressure section having different pressure levels; an ammonia decomposer decomposing ammonia with the combustion gases discharged from the gas turbine; a first exhaust gas line through which the exhaust gases discharged from the gas turbine are transferred to the HRSG; a second exhaust gas line through which the exhaust gases discharged from the gas turbine are transferred to the ammonia decomposer; a third exhaust gas line through which the exhaust gases discharged from the ammonia decomposer are transferred to the HRSG; and a decomposed gas transfer tube connecting the ammonia decomposer and the combustor to transfer decomposed gases generated with the decomposition of ammonia to the combustor.

The first exhaust gas line may be connected to the high-pressure section to supply the exhaust gases to the high-pressure section.

The third exhaust gas line may be connected to the low-pressure section to supply the exhaust gases to the low-pressure section.

The low-pressure section may include a condensate preheater configured to heat condensate, and a low-pressure evaporator configured to heat feedwater and convert the feedwater into steam.

The third exhaust gas line may be installed upstream of the condensate preheater with reference to a flow direction of the exhaust gases to transfer heat to the condensate preheater.

The third exhaust gas line may be installed upstream of the low-pressure evaporator with respect to a flow direction of the exhaust gases to transfer heat to the low-pressure evaporator.

A heat exchanger may be installed on the second exhaust gas line to exchange heat between the exhaust gases flowing into the ammonia decomposer and the exhaust gases discharged from the ammonia decomposer.

The second exhaust gas line and the third exhaust gas line may be connected to the heat exchanger.

The third exhaust gas line may be connected with a bypass line bypassing the heat exchanger.

A control valve may be installed on the bypass line to control a flow rate of the exhaust gases flowing through the bypass line.

In another aspect of the present disclosure, there is provided a method of driving a combined power generation system including a gas turbine, a steam turbine, a heat recovery steam generator (HRSG), and an ammonia decomposer configured to decompose ammonia and supply ammonia-decomposed gases to a combustor of a gas turbine, the method including: an exhaust gas supply step of supplying exhaust gases generated in the gas turbine to the ammonia decomposer and the HRSG; an ammonia decomposition step of decomposing ammonia using heat of the exhaust gases supplied from the gas turbine to generate the ammonia-decomposed gases; a decomposed gas supply step of supplying the decomposed gases generated in the ammonia decomposition step to the combustor; and a combustion and power generation step of combusting the decomposed gases in the combustor to generate exhaust gases to allow a generator to rotate, wherein in the ammonia decomposition step, the exhaust gases having been used in the ammonia decomposition are transferred to the HRSG.

In the ammonia decomposition step, the exhaust gas having been used in the ammonia decomposition may be transferred to a low-pressure section of the HRSG.

The low-pressure section may include a condensate preheater configured to heat condensate, and a low-pressure evaporator configured to heat feedwater and convert the feedwater into steam, and in the ammonia decomposition step, the exhaust gases may be transferred upstream of the condensate preheater with respect to a flow direction of the exhaust gases.

The low-pressure section may include a condensate preheater configured to heat condensate, and a low-pressure evaporator configured to heat feedwater and convert the feedwater into steam, and in the ammonia decomposition step, the exhaust gases may be transferred upstream of the low-pressure evaporator with respect to a flow direction of the exhaust gases.

In the exhaust gas supply step, after heat exchange between the exhaust gases discharged from the gas turbine and the exhaust gases discharged from the ammonia decomposer in a heat exchanger, the exhaust gases discharged from the gas turbine may be transferred to the ammonia decomposer, and the exhaust gases discharged from the ammonia decomposer may be transferred to the HRSG.

In the exhaust gas supply step, a portion of the exhaust gases having been used in the ammonia decomposition may be transferred to the HRSG through the heat exchanger, and the rest of the exhaust gases may be transferred to the HRSG while bypassing the heat exchanger through a bypass line.

In the combined power generation system according to the present disclosure, ammonia is decomposed into decomposed gases by using exhaust gases discharged from the gas turbine, the decomposed gases generated with the ammonia decomposition are combusted in the combustor, the exhaust gases having been used in the ammonia decomposition are transferred to the HRSG, thereby minimizing the emission of carbon dioxide during the ammonia decomposition and combustion process and improving thermal efficiency.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
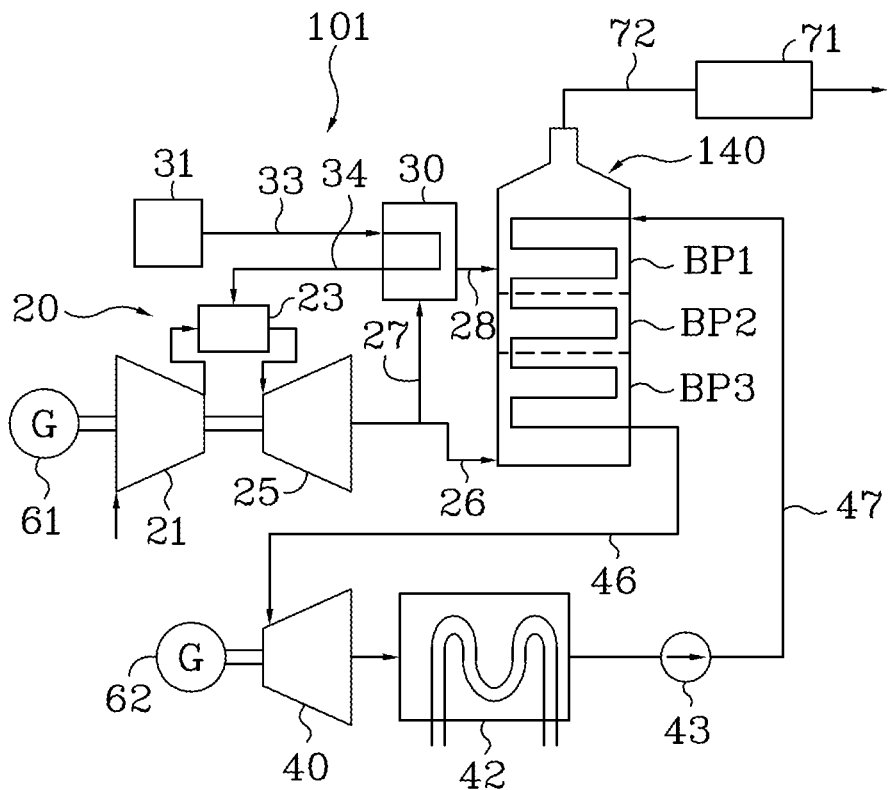
FIG. 1 is a block diagram illustrating a combined power generation system according to a first embodiment of the present disclosure.

Hereinafter, exemplary embodiments of the present disclosure will be described in detail with reference to the accompanying drawings. However, it should be noted that the present disclosure is not limited thereto, and may include all modifications, equivalents, or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols whenever possible. Further, the detailed description of known functions and configurations that may obscure the gist of the present disclosure will be omitted. For the same reason, some of the elements in the drawings are exaggerated, omitted, or schematically illustrated.

Hereinafter, a gas turbine according to a first embodiment of the present disclosure will be described.

Figure 2:
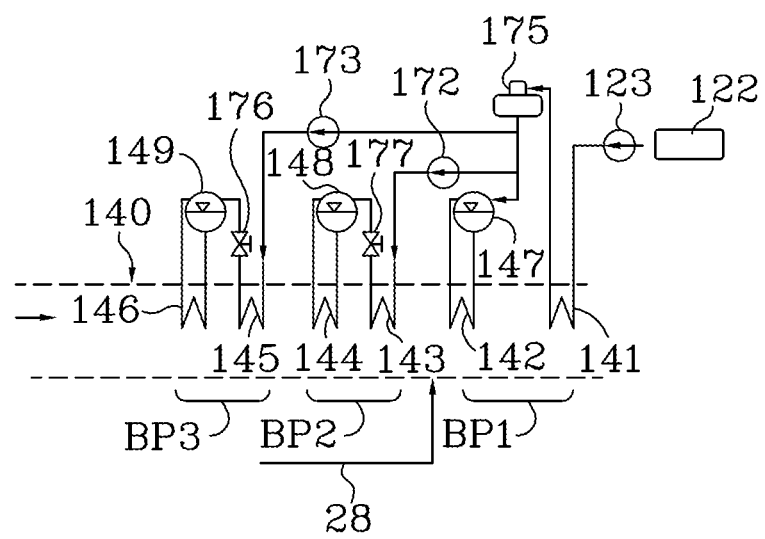
FIG. 2 is a block diagram illustrating a heat recovery steam generator (HRSG) according to the first embodiment.

FIG. 1 is a block diagram illustrating a combined power generation system according to a first embodiment of the present disclosure, and FIG. 2 is a block diagram illustrating a heat recovery steam generator (HRSG) according to the first embodiment.

Referring to FIGS. 1 and 2, the combined power generation system 101 according to the first embodiment includes a plurality of turbines to generate electric power. The combined power system 101 includes a gas turbine 20, a generator 61, 62, a heat recovery steam generator (HRSG) 140, a steam turbine 40, an ammonia decomposer 30, a first exhaust gas line 26, a second exhaust gas line 27, and a third exhaust gas line 28.

The gas turbine 20 according to this embodiment may serve to suck atmospheric air, compress the air to a high pressure, burn an air-fuel mixture in static pressure conditions to release thermal energy, expand this high temperature combustion gas for conversion into kinetic energy, and then discharge exhaust gases containing the residual energy to the atmosphere.

The gas turbine 20 may include a compressor 21, a combustor 23, and a main turbine section 25. The compressor 21 of the gas turbine 20 may suck and compress external air. The compressor 21 may serve both to supply the compressed air by compressor blades to the combustor 23 and to supply the cooling air to a high temperature region of the gas turbine 20. Here, since the sucked air undergoes an adiabatic compression process in the compressor 21, the air passing through the compressor 21 increases in pressure and temperature.

The compressor 21 is usually designed as a centrifugal compressor or an axial compressor, wherein the centrifugal compressor is applied to a small-scale gas turbine, whereas a multi-stage axial compressor is applied to a large-scale gas turbine 20.

The combustor 23 may mix compressed air supplied from an outlet of the compressor 21 with fuel and combust the air-fuel mixture at a constant pressure to produce a high-energy combustion gas (e.g., a high-temperature, high-pressure gas).

High temperature, high pressure gases generated by the combustor 23 are supplied to the main turbine section 25. In the main turbine section 25, the exhaust gases undergo adiabatic expansion and impacts and drives a plurality of blades arranged radially around a rotary shaft of the main turbine section 25 so that heat energy of the exhaust gases is converted into mechanical energy with which the rotary shaft is rotated. A portion of the mechanical energy obtained from the main turbine section 25 is supplied as the energy required to compress the air in the compressor, and the rest is utilized as an available energy to drive the generator 61 to produce electric power.

The exhaust gases discharged from the main turbine section 25 are cooled through the HRSG 140 and then purified and discharged to the outside. The HRSG 140 serves to not only cool the combustion gas, but also generate high-temperature and high-pressure steam using the heat of the combustion gas and deliver it to the steam turbine 40.

The steam generated in the HRSG 140 is transmitted to the steam turbine 40 through a steam feed line 46, and feed water cooled in the steam turbine 40 is transmitted to the HRSG through a feedwater recovery line 47. A discharge line 72 through which the exhaust gases discharged through the HRSG 140 flow and a purifier 71 that removes contaminants contained in the exhaust gases may be connected to the HRSG 140.

The steam turbine 40 rotates blades using the steam generated by the HRSG 140 and transmits the rotational energy to the generator 62. The steam turbine 40 supplies the cooled steam back to the HRSG 140.

In the present embodiment, although the steam turbine 40 and the gas turbine 20 are exemplified as being connected to different generators, the present disclosure is not limited thereto. Rather, the steam turbine 40 and the gas turbine 20 may be connected in series to a single generator.

The feedwater recovery line 47 may be connected with a condenser 42 for condensing steam and a condensate pump 43 for supplying the condensed feedwater to the HRS G.

The steam flowing in the HRSG 140 may have at least two or three levels of pressure, and accordingly, the feedwater is pressurized to at least two or three pressure levels. In this embodiment, the HRSG 140 is exemplified as having three levels of pressure.

The HRSG 140 may include a low-pressure section BP1 having a relatively low pressure, a medium-pressure section BP2 having a medium pressure, and a high-pressure section BP3 having a relatively high pressure. The high-pressure section BP3 may be disposed adjacent to an inlet side of the HRSG, through which exhaust gases are introduced, and may be heated by high-temperature exhaust gases, and the low-pressure section BP1 may be disposed adjacent to an outlet side of the HRSG, through which the exhaust gases are discharged, and may be heated by low-temperature exhaust gases.

The HRSG 140 houses a condensate preheater 141, a low-pressure evaporator 142, a medium-pressure economizer 143, a medium-pressure evaporator 144, a high-pressure economizer 145, and a high-pressure evaporator 146. In addition, superheaters (not shown) may be additionally installed on the upstream sides of the evaporators, respectively. The exhaust gases discharged from the HRSG 140 may be discharged through a stack.

The low-pressure section BP1 includes the condensate preheater 141, the low-pressure evaporator 142, and a low-pressure drum 147. The condensate stored in the condensate storage tank 122 is transferred to the condensate preheater 141 by a condensate pump 123, and the condensate preheater 141 heats the condensate through heat exchange with combustion gas. The feedwater heated in the condensate preheater 141 is transferred to a deaerator 175 so that gases are removed from the condensate.

Feedwater is supplied from the deaerator 175 to the low-pressure drum 147, and the low-pressure evaporator 142 is connected to the low-pressure drum 147 to heat the feedwater stored in the low-pressure drum 147 so that the feedwater is converted into steam, which may be separated in the low-pressure drum 147 and then supplied to the superheater.

Meanwhile, the medium-pressure section BP2 includes the medium-pressure economizer 143, the medium-pressure evaporator 144, and a medium-pressure drum 148. The feedwater in the deaerator 175 is supplied to the medium-pressure economizer 143 by a medium-pressure pump 172, and the medium-pressure economizer 143 heats the feedwater through heat exchange with combustion gas. The feedwater heated in the medium-pressure economizer 143 is supplied to the medium-pressure drum 148, and the medium-pressure evaporator 144 is connected to the medium-pressure drum 148 to heat the feedwater stored in the medium-pressure drum 148 so that the feedwater is converted into steam, which may be separated in the medium-pressure drum 148 and then supplied to the superheater.

The high-pressure section BP3 includes the high-pressure economizer 145, the high-pressure evaporator 146, and a high-pressure drum 149. The feedwater in the deaerator 175 is supplied to the high-pressure economizer 145 by a high-pressure pump 173, and the high-pressure economizer 145 heats the feedwater through heat exchange with combustion gas. The feedwater heated in the high-pressure economizer 145 is supplied to a high-pressure drum 149, and the high-pressure evaporator 146 is connected to the high-pressure drum 149 to heat the feedwater stored in the high-pressure drum 149 so that the feedwater is converted into steam, which may be separated in the high-pressure drum 149 and then supplied to the superheater.

The steam stored in the low-pressure drum 147, the medium-pressure drum 148, and the high-pressure drum 149 may be supplied to respective low-pressure, medium-pressure, and high-pressure steam turbines after being heated in the superheaters.

The ammonia decomposer 30 thermally decomposes liquefied or gaseous ammonia to generate hydrogen and nitrogen. The ammonia decomposer 30 decomposes ammonia using a catalyst including a metal such as ruthenium, nickel, etc. An ammonia storage unit 31 is connected to the ammonia decomposer 30 via an ammonia transfer tube 33 to supply ammonia to the ammonia decomposer 30.

A decomposed gas transfer tube 34 connects the ammonia decomposer 30 and the combustor 23 to transfer decomposed gases generated with decomposition of ammonia to the combustor 23. The decomposed gases may include hydrogen, nitrogen, and unreacted ammonia. Accordingly, the decomposed gases generated with decomposition of ammonia may be combusted in the combustor 23 to generate exhaust gases. A pump for compressing the decomposed gases may be installed in the decomposed gas transfer tube 34.

The first exhaust gas line 26 transfers the exhaust gases discharged from the gas turbine 20 to the HRSG 140. The first exhaust gas line 26 may supply the exhaust gases to the high-pressure section BP3 of the HRSG 140.

The second exhaust gas line 27 diverts a portion of the exhaust gases discharged from the gas turbine 20 and supplies the diverted portion to the ammonia decomposer 30. The second exhaust gas line 27 is connected to the first exhaust gas line 26 to divert a portion of the exhaust gases from the first exhaust gas line 26 and supply the diverted portion to the ammonia decomposer 30.

As in the present embodiment, when the high-temperature exhaust gases are supplied to the ammonia decomposer 30 through the second exhaust gas line 27 a sufficient heat source required for ammonia decomposition can be supplied without a separate burner. Accordingly, emission of air pollutants due to the use of the burner may be reduced.

The third exhaust gas line 28 transfers the exhaust gases discharged from the ammonia decomposer 30 to the HRSG 140. The third exhaust gas line 28 may transfer the exhaust gases discharged after being used in the ammonia decomposer 30 to the low-pressure section BP1 of the HRSG 140. The third exhaust gas line 28 may be installed on the upstream side of the condensate preheater 141 (based on a flow direction of the exhaust gases) to transfer heat to the condensate preheater 141. Accordingly, since the heat source of the exhaust gases discharged from the ammonia decomposer 30 is recovered and used, thermal efficiency can be improved.

As described above, according to the present embodiment, since the decomposed gas generated by the decomposition of ammonia is combusted in the combustor 23, no carbon dioxide may be generated during combustion. In addition, since the decomposition of ammonia is carried out with the heat source of the exhaust gases discharged from the gas turbine 20, and the exhaust gases discharged from the ammonia decomposer 30 are transferred to the HRSG 140, thermal efficiency can be improved.

Hereinafter, a method of driving the combined power generation system according to the first embodiment of the present disclosure will be described.

Figure 3:
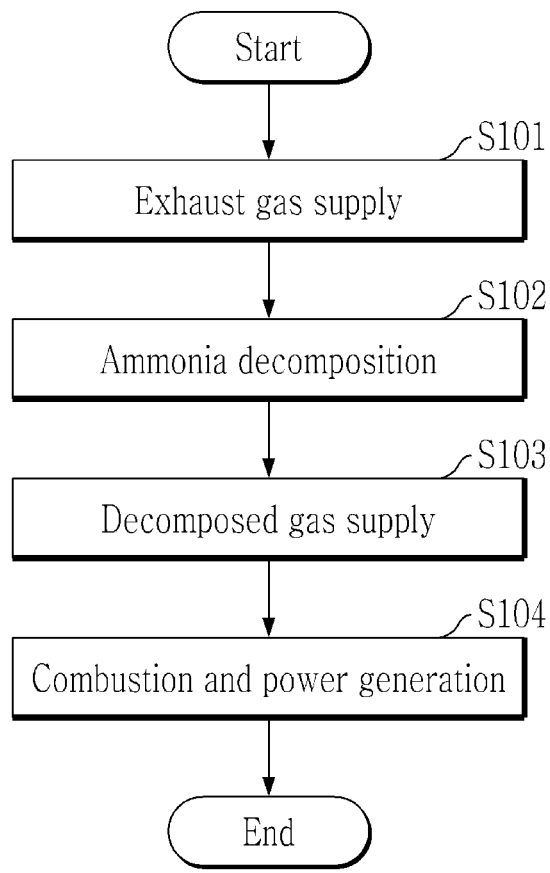
FIG. 3 is a flowchart illustrating a method of operating the combined power generation system according to the first embodiment.

FIG. 3 is a flowchart illustrating a method of driving the combined power generation system according to the first embodiment of the present disclosure.

Referring to FIGS. 1 and 3, the driving method of the combined power generation system according to the first embodiment includes an exhaust gas supply step S101, an ammonia decomposition step S102, a decomposed gas supply step S103, and a combustion and power generation step S104.

In the exhaust gas supply step S101, the exhaust gas generated from the gas turbine 20 is supplied to the ammonia decomposer 30 and the HRSG 140. In the exhaust gas supply step S101, exhaust gases are generated through combustion of fuel such as ammonia or the like in the combustor 23 of the gas turbine 20, and the exhaust gases are supplied to the HRSG 140 and the ammonia decomposer 30 through the main turbine 25.

In the ammonia decomposition step S102, ammonia is decomposed into hydrogen, nitrogen, and the like with heat of the exhaust gases supplied from the gas turbine to generate decomposed gases. The decomposed gases may include hydrogen, nitrogen, and unreacted ammonia. In the ammonia decomposition step, ammonia may be decomposed by using a catalyst such as ruthenium, etc.

In the ammonia decomposition step S102, the exhaust gases having been used in ammonia decomposition is transferred to the low-pressure section BP1 of the HRSG 140. The exhaust gases having been used in the ammonia decomposition step S102 may be supplied on the upstream side of the condensate preheater 141 of the HRSG 140 to transfer heat to the condensate preheater 141.

In the decomposed gas supply step S103, the decomposed gases generated in the ammonia decomposition step S102 are supplied to the combustor 23. In the decomposed gas supply step S103, the decomposed gases may be compressed and supplied to the combustor.

In the combustion and power generation step S104, the decomposed gases are combusted in the combustor 23 to generate a high-pressure exhaust gas, which is in turn supplied to the main turbine 25 so that the generator 61 is powered by the rotational force of the main turbine 25. In addition, in the combustion and power generation step S104, a high-pressure steam generated in the HRSG 140 is supplied to the steam turbine 40, so that the steam turbine 40 may rotate the generator 62.

Hereinafter, a combined power generation system according to a second embodiment of the present disclosure will be described.

Figure 4:
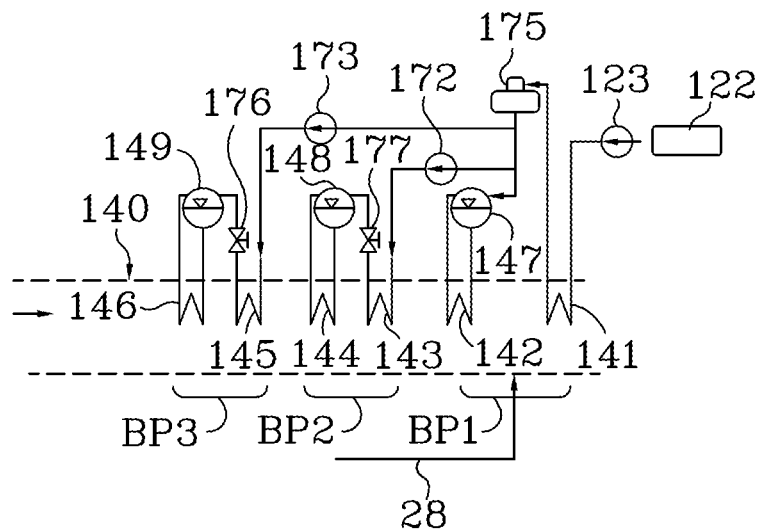
FIG. 4 is a block diagram illustrating a heat recovery steam generator (HRSG) according to a second embodiment of the present disclosure.

FIG. 4 is a block diagram illustrating a heat recovery steam generator (HRSG) according to the second embodiment of the present disclosure.

Referring to FIG. 4, the combined power generation system according to this embodiment is the same as the combined power generation system according to the first embodiment, except for a connection between the third exhaust gas line 28 and the HRSG 140, so a redundant description of the same configuration will be omitted.

Referring to FIG. 4, the third exhaust gas line 28 connects the ammonia decomposer 30 and the HRSG 140 to transfer the exhaust gases discharged from the ammonia decomposer 30 to the HRSG 140. The third exhaust gas line 28 may transfer the exhaust gases discharged after being used in the ammonia decomposer 30 to the low-pressure section BP1 of the HRSG 140. The third exhaust gas line 28 may be installed on the upstream side of a low-pressure evaporator 142 (based on a flow direction of the exhaust gases) to transfer heat to the low-pressure evaporator 141. Accordingly, since the heat source of the exhaust gases discharged from the ammonia decomposer 30 is recovered and used, thermal efficiency can be improved.

Hereinafter, a method of driving the combined power generation system according to the second embodiment of the present disclosure will be described.

The driving method of the combined power generation system according to the second embodiment of the present embodiment may include an exhaust gas supply step, an ammonia decomposition step, a decomposed gas supply step, and a combustion and power generation step.

The driving method of the combined power generation system according to the second embodiment of the present embodiment has the same configuration as the driving method of the combined power generation system according to the first embodiment, except for the ammonia decomposition step, so a redundant description of the same configuration will be omitted.

In the ammonia decomposition step, the exhaust gases having been used in ammonia decomposition are transferred to the low-pressure section BP1 of the HRSG 140. The exhaust gases having been used in ammonia decomposition may be supplied on the upstream side of a low-pressure evaporator 142 of the HRSG to transfer heat to the low-pressure evaporator 142. Accordingly, since the heat source of the exhaust gases discharged from the ammonia decomposer 30 is recovered and used, thermal efficiency can be improved.

Figure 5:
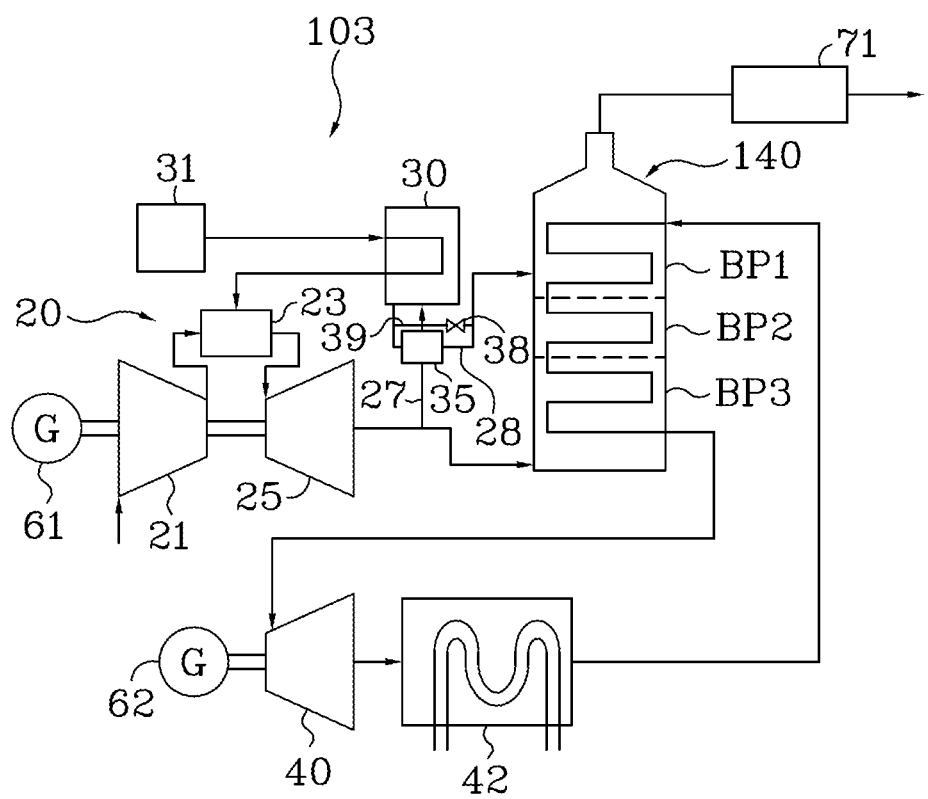
FIG. 5 is a block diagram illustrating a combined power generation system according to a third embodiment of the present disclosure.

FIG. 5 is a block diagram illustrating the combined power generation system according to the third embodiment of the present disclosure.

Referring to FIG. 5, the combined power generation system 103 according to this embodiment is the same as the combined power generation system according to the first embodiment, except for a heat exchanger 35, so a redundant description of the same configuration will be omitted.

The combined power generation system 103 according to the present embodiment may further include a heat exchanger 35 installed on the second exhaust gas line 27. The heat exchanger 35 exchanges heat between exhaust gases flowing into the ammonia decomposer 30 and exhaust gases discharged after having been used in ammonia decomposition. To this end, the heat exchanger 35 is connected with the second exhaust gas line 27 and the third exhaust gas line 28.

If the exhaust gases discharged from the gas turbine 20 is too hot, the exhaust gases may be supplied to the ammonia decomposer 30 after being cooled with exhaust gases discharged from the ammonia decomposer 30, and the exhaust gases heated in the heat exchanger 35 may be supplied to the HRSG 140.

A bypass line 39 bypassing the heat exchanger 35 may be connected to the third exhaust gas line 28, and a control valve 38 may be installed on the bypass line 39 to control a flow rate of the exhaust gases flowing along the bypass line 39.

When the bypass line 39 is installed, only a portion of the exhaust gases flows through the heat exchanger 35 and the rest of exhaust gases can flow to the HRSG 140 while being bypassed along the bypass line 39. The temperature of the exhaust gases flowing into the ammonia decomposer 30 may be controlled by controlling a flow rate of the exhaust gases flowing along the bypass line 39.

Hereinafter, a method of driving the combined power generation system according to a third embodiment of the present disclosure will be described.

The driving method of the combined power generation system according to the third embodiment of the present embodiment may include an exhaust gas supply step, an ammonia decomposition step, a decomposed gas supply step, and a combustion and power generation step.

The driving method of the combined power generation system according to the third embodiment of the present embodiment has the same configuration as the driving method of the combined power generation system according to the first embodiment, except for the exhaust gas supply step, so a redundant description of the same configuration will be omitted.

In the exhaust gas supply step, the exhaust gases having been used in ammonia decomposition are transferred to the low-pressure section of the HRSG 140. In addition, in the exhaust gas supply step, after exhaust gases discharged from the gas turbine 20 and exhaust gases discharged from the ammonia decomposer 30 are heat-exchanged, the exhaust gases discharged from the gas turbine 20 are transferred to the ammonia decomposer 30, and the exhaust gases discharged from the ammonia decomposer 30 are transferred to the HRSG 140.

In addition, in the exhaust gas supply step, a portion of the exhaust gases having been used in ammonia decomposition may be transferred to the HRSG 140 through the heat exchanger 35, and the remaining exhaust gases may be transferred to the HRSG 140 while bypassing the heat exchanger 35 along the bypass line 39.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure.

What is claimed is:

1. A combined power generation system comprising:
   a gas turbine combusting fuel to generate rotational force;
   a heat recovery steam generator (HRSG) configured to heat feedwater using combustion gases discharged from the gas turbine and having a high-pressure section, a medium-pressure section, and a low-pressure section having different pressure levels;
   an ammonia decomposer for decomposing ammonia with the combustion gases discharged from the gas turbine;
   a first exhaust gas line through which the exhaust gases discharged from the gas turbine are transferred to the HRSG;
   a second exhaust gas line through which the exhaust gases discharged from the gas turbine are transferred to the ammonia decomposer;
   a third exhaust gas line through which the exhaust gases discharged from the ammonia decomposer are transferred to the HRSG; and
   a decomposed gas transfer tube connecting the ammonia decomposer and the combustor to transfer decomposed gases generated with the decomposition of ammonia to the combustor; wherein:
   the first exhaust gas line is connected to the high-pressure section to supply the exhaust gases to the high-pressure section; and
   a heat exchanger is installed on the second exhaust gas line to exchange heat between the exhaust gases flowing into the ammonia decomposer and the exhaust gases discharged from the ammonia decomposer.

2. The combined power generation system according to claim 1, wherein the third exhaust gas line is connected to the low-pressure section to supply the exhaust gases to the low-pressure section.

3. The combined power generation system according to claim 1, wherein the low-pressure section includes a condensate preheater configured to heat condensate, and a low-pressure evaporator configured to heat feedwater and convert the feedwater into steam.

4. The combined power generation system according to claim 3, wherein the third exhaust gas line is installed upstream of the condensate preheater with reference to a flow direction of the exhaust gases to transfer heat to the condensate preheater.

5. The combined power generation system according to claim 3, wherein the third exhaust gas line is installed upstream of the low-pressure evaporator with respect to a flow direction of the exhaust gases to transfer heat to the low-pressure evaporator.

6. The combined power generation system according to claim 1, wherein the second exhaust gas line and the third exhaust gas line are connected to the heat exchanger.

7. The combined power generation system according to claim 6, wherein the third exhaust gas line is connected with a bypass line bypassing the heat exchanger.

8. The combined power generation system according to claim 7, wherein a control valve is installed on the bypass line to control a flow rate of the exhaust gases flowing through the bypass line.

9. A method of driving a combined power generation system comprising a gas turbine, a steam turbine, a heat recovery steam generator (HRSG), and an ammonia decomposer configured to decompose ammonia and supply ammonia-decomposed gases to a combustor of a gas turbine, the method comprising:

an exhaust gas supply step of supplying exhaust gases generated in the gas turbine to the ammonia decomposer and the HRSG;

an ammonia decomposition step of decomposing ammonia using heat of the exhaust gases supplied from the gas turbine to generate the ammonia-decomposed gases;

a decomposed gas supply step of supplying the decomposed gases generated in the ammonia decomposition step to the combustor; and a combustion and power generation step of combusting the decomposed gases in the combustor to generate exhaust gases to allow a generator to rotate, wherein:

the low-pressure section comprises a condensate preheater configured to heat condensate, and a low-pressure evaporator configured to heat feedwater and convert the feedwater into steam, in the exhaust gas supply step, after heat exchange between the exhaust gases discharged from the gas turbine and the exhaust gases discharged from the ammonia decomposer in a heat exchanger, the exhaust gases discharged from the gas turbine are transferred to the ammonia decomposer, and the exhaust gases discharged from the ammonia decomposer are transferred to the HRSG; and in the ammonia decomposition step, the exhaust gases are transferred upstream of the low-pressure evaporator with respect to a flow direction of the exhaust gases and the exhaust gases having been used in the ammonia decomposition are transferred to a low pressure section of the HRSG.

10. The method according to claim 9, wherein the low-pressure section comprises a condensate preheater configured to heat condensate, and a low-pressure evaporator configured to heat feedwater and convert the feedwater into steam, and wherein in the ammonia decomposition step, the exhaust gases are transferred upstream of the condensate preheater with respect to a flow direction of the exhaust gases.

11. The method according to claim 9, wherein in the exhaust gas supply step, a portion of the exhaust gases having been used in the ammonia decomposition is transferred to the HRSG through the heat exchanger, and the rest of the exhaust gases is transferred to the HRSG while bypassing the heat exchanger through a bypass line.

* * * * *